United States Patent
Luketich

(10) Patent No.: US 12,546,452 B1
(45) Date of Patent: Feb. 10, 2026

(54) VEHICLE LAMP

(71) Applicant: SL Corporation, Daegu (KR)

(72) Inventor: Michael J. Luketich, Auburn Hills, MI (US)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/988,287

(22) Filed: Dec. 19, 2024

(51) Int. Cl.
| | | |
|---|---|---|
| *F21S 43/00* | (2018.01) | |
| *F21S 41/64* | (2018.01) | |
| *F21S 43/20* | (2018.01) | |
| *F21S 43/245* | (2018.01) | |
| *F21S 43/247* | (2018.01) | |
| *F21S 43/249* | (2018.01) | |
| *F21V 14/08* | (2006.01) | |

(52) U.S. Cl.
CPC ........... *F21S 43/601* (2024.05); *F21S 43/247* (2018.01); *F21S 43/255* (2018.01); *F21S 43/28131* (2024.05); *F21V 14/08* (2013.01); *F21S 41/64* (2018.01); *F21S 41/645* (2018.01); *F21S 43/245* (2018.01); *F21S 43/249* (2018.01); *F21S 43/28133* (2024.05)

(58) Field of Classification Search
CPC .. G02F 1/133603; F21V 14/08; F21S 43/247; F21S 43/255; F21S 43/601; F21S 43/28131; F21S 41/64; F21S 41/645; F21S 43/245; F21S 43/249; F21S 43/28133
See application file for complete search history.

(56) References Cited

U.S. PATENT DOCUMENTS

| | | | |
|---|---|---|---|
| 11,560,997 B2 * | 1/2023 | Sainis | F21S 43/30 |
| 2020/0264461 A1 * | 8/2020 | Kuwana | G02F 1/1336 |

FOREIGN PATENT DOCUMENTS

| | | | | |
|---|---|---|---|---|
| CN | 116594209 A | * | 8/2023 | G02F 1/1323 |
| EP | 0633488 A1 | * | 1/1995 | G02F 1/091 |

OTHER PUBLICATIONS

Machine translation of CN 116594209 A retrieved from the FIT database of PE2E search. (Year: 2025).*

* cited by examiner

*Primary Examiner* — Colin J Cattanach
(74) *Attorney, Agent, or Firm* — United One Law Group LLC; Kongsik Kim; Jhongwoo Peck

(57) ABSTRACT

A vehicle lamp that reflects or obstructs light using a film filled with metal flakes, thereby emitting light in a preset pattern includes a light source that emits light, a main film disposed in a light emission path of the light source, and a magnetic field generating unit that generates a magnetic field that influences the main film. The main film includes a functional layer that selectively transmits the light depending on the magnetic field.

14 Claims, 17 Drawing Sheets

(a)

(b)

(c)

(d)

VEHICLE LAMP

BACKGROUND

1. Technical Field

The present disclosure relates to a vehicle lamp, and more particularly, to a vehicle lamp that reflects or blocks light using a film filled with metal flakes, thereby emitting light in a preset pattern.

2. Description of the Related Art

In general, vehicles are equipped with lamp modules that provide an illumination function for more easily identifying objects around the vehicles during low-light conditions (e.g., night-time driving) and a signaling function for notifying the driving status of the vehicles to other vehicles or road users.

For example, headlights and fog lights serve the purpose of illumination, and turn signals, tail lights, brake lights, and side markers serve the purpose of signaling.

Recently, lamp modules have evolved beyond simple illumination or signaling functions to improve visibility by emitting light having particular shapes to the outside and to enhance the brand recognition.

Meanwhile, since modifying the shape of light emitted to the outside of a vehicle is a conventional technology, differentiating from other products through this alone is rather limited.

Therefore, there is a need for a vehicle lamp that can provide a more clear distinction from other products.

SUMMARY

Aspects of the present disclosure provide a vehicle lamp that reflects or blocks light using a film filled with metal flakes, thereby allowing light to be emitted in a preset pattern.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a light source that emits light, a main film disposed in a light emission path of the light source, and a magnetic field generating unit that generates a magnetic field that influences the main film. The main film may include a functional layer that selectively transmits the light based on the magnetic field.

The functional layer may include a functional cover, a filler provided inside the functional cover, and metal flakes provided inside the functional cover and configured to move within the filler under the influence of the magnetic field. The metal flakes may be configured to obstruct or reflect the light emitted by the light source.

The vehicle lamp may further include a substrate on which the magnetic field generating unit is disposed. A plurality of magnetic field generating units may be disposed on the substrate, and the plurality of magnetic field generating units may be configured to generate the magnetic field independent of one another. The light source may be disposed on the substrate.

The vehicle lamp may further include a guide film that is laminated on the substrate and guides the light emitted by the light source, which is incident through a side of the guide film, to the main film. The substrate may be formed of a transparent material, and the light emitted from a surface of the guide film may pass through the substrate and be irradiated to the main film.

In some embodiments, the main film may include a guide layer that is laminated on the functional layer and guides the light emitted by the light source, which is incident through a side of the guide layer, to the functional layer. The guide layer may be laminated on a light-receiving surface or a light-emitting surface of the functional layer. The main film may further include a color layer that is provided between the magnetic field generating unit and the guide layer and converts the light guided by the guide layer into a preset color. The color layer may be configured to reflect ambient light in the preset color.

In some embodiments, the main film may include a color layer that is provided between the light source and the functional layer and converts the light emitted by the light source into a preset color. The color layer may be configured to reflect ambient light in the preset color.

The magnetic field generating unit may include an inductor.

The light source may be configured to emit the light toward a surface of the functional layer. The main film may further include a color layer that is provided between the magnetic field generating unit and the functional layer and reflects, in a preset color, the light emitted by the light source that passes through the functional layer.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
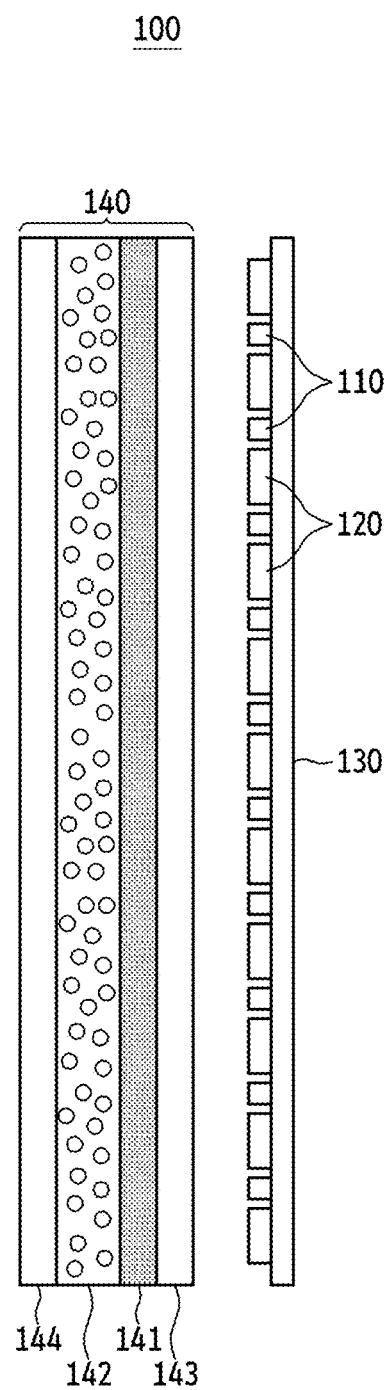
FIG. 1 is a diagram illustrating a vehicle lamp according to a first embodiment of the present disclosure.

Exemplary embodiments of the present disclosure will hereinafter be described in detail with reference to the accompanying drawings. The advantages and features of the present disclosure, and methods for achieving them, will become apparent by referring to the embodiments described below in detail in conjunction with the accompanying drawings. However, the present disclosure is not limited to the embodiments disclosed below and can be implemented in various other forms. These embodiments are provided to make the present disclosure thorough and to fully convey the scope of the disclosure to those skilled in the art to which the disclosure pertains. The present disclosure is defined only by the claims. Throughout the specification, like reference numerals refer to like elements.

Unless otherwise defined, all terms (including technical and scientific terms) used herein can be understood to have the same meaning as commonly understood by one of ordinary skill in the art to which this disclosure belongs. Terms defined in commonly used dictionaries should be interpreted consistently with their meanings in the relevant art and not in an idealized or excessive sense unless expressly defined.

Figure 2:
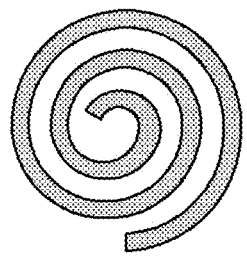
FIG. 2 is a diagram illustrating magnetic field generating units.
Figure 2:
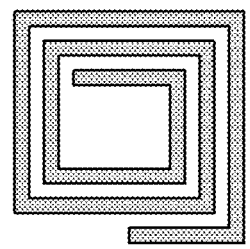
Figure 2:
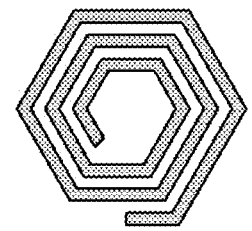
Figure 2:
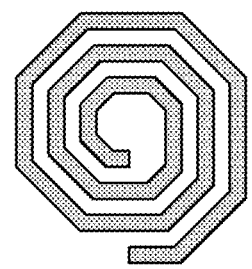
Figure 3:
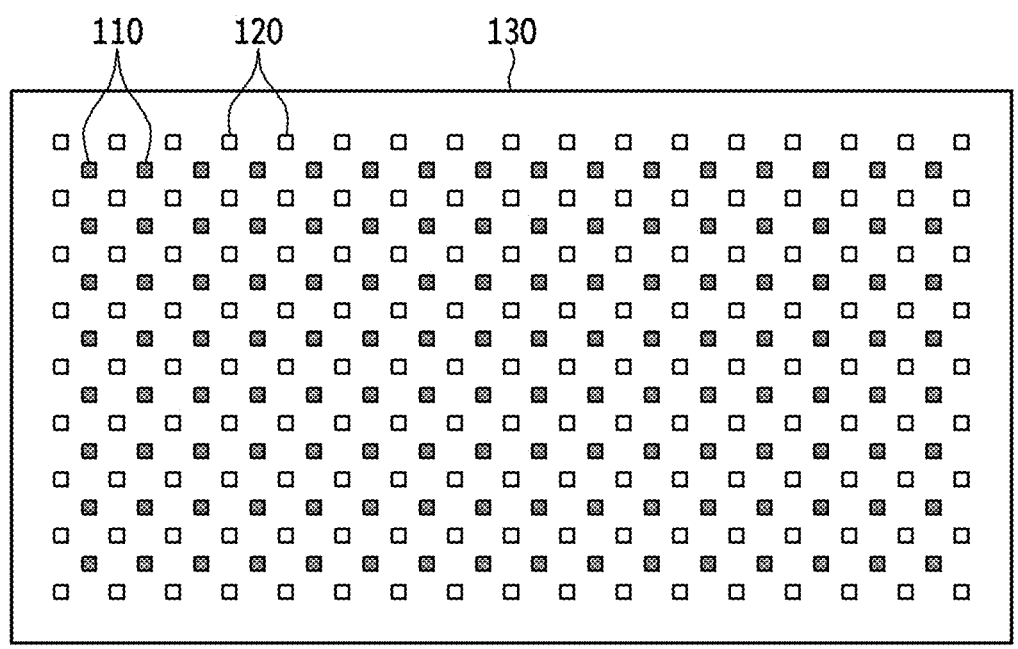
FIG. 3 is a diagram illustrating a configuration where light sources and the magnetic field generating units are arranged on a substrate.

FIG. 1 is a diagram illustrating a vehicle lamp according to a first embodiment of the present disclosure, FIG. 2 is a diagram illustrating magnetic field generating units, and FIG. 3 is a diagram illustrating a configuration where a light source and the magnetic field generating unit are arranged on a substrate.

Referring to FIG. 1, a vehicle lamp 100 according to the first embodiment may include one or more light sources 110, one or more magnetic field generating units 120, a substrate 130, and a main film 140.

The light sources 110 may emit light. Each of the light sources 110 may include a light-emitting module that generates light, and may be implemented as one of a light-emitting diode (LED), laser, or a bulb-type light source. The light sources 110 may emit light with a predetermined angular range.

The magnetic field generating units 120 may generate magnetic fields. Specifically, the magnetic field generating units 120 may generate magnetic fields that can influence the main film 140. In this embodiment, the magnetic field generating units 120 may each be provided in the form of an inductor.

Referring to FIG. 2, each magnetic field generating unit 120 may be provided in the form of a flat spiral inductor having a predetermined length. Panel (a) of FIG. 2 illustrates a circular spiral magnetic field generating unit 120, panel (b) of FIG. 2 illustrates a rectangular spiral magnetic field generating unit 120, panel (c) of FIG. 2 illustrates a hexagonal spiral magnetic field generating unit 120, and panel (d) of FIG. 2 illustrates an octagonal spiral magnetic field generating unit 120. As electric current flows from one terminal to the other terminal of each magnetic field generating unit 120, a magnetic field may be generated in the body of the magnetic field generating unit 120. The magnetic flux density may vary depending on the distance from a conductor constituting the inductor. Specifically, the magnetic flux density may increase as it goes closer to the conductor and may decrease as it goes further away from the conductor. Therefore, when the magnetic field generating unit 120 is provided in a circular spiral form, the magnetic flux density may be concentrated at the center of the magnetic field generating unit 120, resulting in a stronger magnetic field near the center, and a weaker magnetic field further away from the center. Meanwhile, the shapes of the magnetic field generating unit 120 illustrated in FIG. 2 are merely illustrative, and the magnetic field generating unit 120 may be provided in various forms capable of generating a magnetic field appropriate for the design requirements.

Referring to FIGS. 1 and 3, the magnetic field generating units 120 may be disposed on the substrate 130.

A plurality of magnetic field generating units 120 may be provided. The plurality of magnetic field generating units 120 may be arranged on the substrate 130. Specifically, the plurality of magnetic field generating units 120 may be uniformly arranged at predetermined intervals on the substrate 130. At least one selected magnetic field generating unit 120 among the plurality of magnetic field generating units 120 may generate a magnetic field. The plurality of magnetic field generating units 120 arranged on the substrate 130 may individually determine whether to generate a magnetic field. Some of the plurality of magnetic field generating units 120 may generate a magnetic field, while the other magnetic field generating units 120 may generate no magnetic field The light sources 110 may be arranged on the substrate 130. A plurality of light sources 110 may be provided. The plurality of light sources 110 may be arranged on the substrate 130. Specifically, the plurality of light sources 110 may be arranged at predetermined intervals between the magnetic field generating units 120. The plurality of light sources 110 arranged on the substrate 130 may individually determine whether to emit light. For example, some of the plurality of light sources 110 may emit light, while the other light sources 110 may emit no light.

Referring back to FIG. 1, the main film 140 may be arranged in the light emission path of the light sources 110.

The main film 140 may include a color layer 141, a functional layer 142, a support layer 143, and a protective layer 144. The color layer 141 may be disposed between the light sources 110 and the functional layer 142 and may convert the light from the light sources 110 into a preset color. Additionally, the color layer 141 may reflect ambient light in the preset color. For example, the color layer 141 may include paint of a specific color.

The color layer 141 may be formed of a material that transmits light. When the light from the light sources 110 passes through the color layer 141, the transmitted light may have the color of the color layer 141. Additionally, when ambient light is reflected by the color layer 141, the reflected light may have the color of the color layer 141. Here, the ambient light may include visible light components irradiated toward the vehicle, such as sunlight or streetlight.

The functional layer 142 may selectively transmit the light from the light sources 110. For example, the functional layer 142 may transmit some of the incident light from the light sources 110 and block the remaining incident light. As will be described later, the functional layer 142 may include metal flakes. The metal flakes may be rearranged (e.g., redistributed) within the functional layer 142 by the influence of the magnetic field. The metal flakes may block or reflect the light from the light sources 110. As the light is interfered with by the metal flakes, some portions of the light from the light sources 110 may pass uninterrupted through the functional layer 142, while other portions may not pass through the functional layer 142. A detailed description of the functional layer 142 will be provided later with reference to FIG. 4.

The support layer 143 may support the color layer 141, the functional layer 142, and the protective layer 144. For example, the support layer 143 may be provided in the form of transparent plastic. As the color layer 141, the functional layer 142, and the protective layer 144 may be laminated on the support layer 143, they may be securely fixed in the form of the main film 140.

The protective layer 144 may protect the color layer 141, the functional layer 142, and the support layer 143. To this end, the protective layer 144 may have relatively high rigidity. Additionally, the protective layer 144 may have relatively high light transmittance. The light from the light sources 110 and the ambient light may pass through the protective layer 144.

Figure 4:
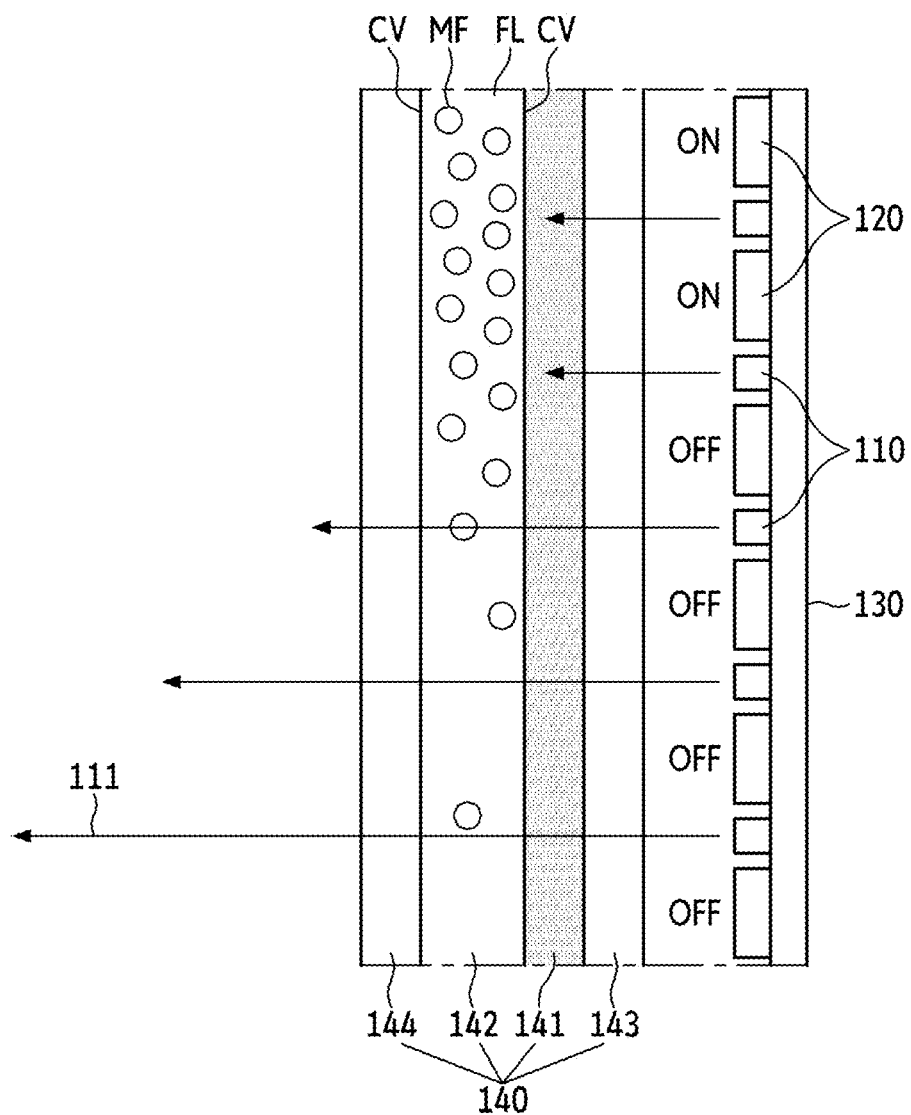
FIG. 4 is a diagram for explaining the operation of a functional layer.

FIG. 4 is a diagram for explaining the operation of the functional layer.

Referring to FIG. 4, the functional layer 142 may include a functional cover CV, a filler FL, and metal flakes MF.

The functional cover CV may accommodate the filler FL and the metal flakes MF therewithin. The functional cover CV may provide a sealed space. The filler FL may be provided inside the functional cover CV and may serve as a medium to create an environment for the movement of the metal flakes MF. For example, the filler FL may be provided in the form of a non-magnetic liquid or gel. The metal flakes MF may be provided inside the functional cover CV and may move within the filler FL. The metal flakes MF may be magnetizable. Thus, the metal flakes MF may be magnetized by a magnetic field and may move within the filler FL.

In the present disclosure, the densities of the filler FL and the metal flakes MF may be designed to be substantially identical or similar. Accordingly, in the absence of a magnetic field, the metal flakes MF may be substantially uniformly distributed within the functional layer 142 without rising to the top of the filler FL due to buoyancy or settling at the bottom of the filler FL due to gravity. FIG. 4 illustrates a state where some of the magnetic field generating units 120 disposed on the substrate 130 generate a magnetic field. Due to the magnetic field, the metal flakes MF may be rearranged within the functional cover CV. For example, the metal flakes MF may move to regions where the magnetic field is stronger.

The rearrangement of the metal flakes MF may change their local concentration within the functional cover CV. In other words, the concentration (e.g., density) distribution of the metal flakes MF inside the functional cover CV may be determined based on the configuration of the magnetic field.

The metal flakes MF may block or reflect light 111 emitted by the light sources 110. Therefore, in regions where the concentration of the metal flakes MF is relatively low, the light 111 from the light sources 110 may more easily pass through the functional layer 142. Conversely, in regions where the concentration of the metal flakes MF is relatively high, the light 111 may not easily pass through the functional layer 142. For example, the concentration of the metal flakes MF and the transmittance of the functional layer 142 for the light 111 may have an inverse relationship. In other words, as the local concentration of the metal flakes MF increases, the transmittance of the functional layer 142 for the light 111 through that region may decrease. Conversely, as the local concentration of the metal flakes MF decreases, the transmittance of the functional layer 142 for the light 111 through that region may increase.

In accordance with the distribution of magnetic fields generated by the magnetic field generating units 120 on the substrate 130, the distribution of the metal flakes MF within the functional layer 142 may be determined, thereby determining in turn the distribution of the light 111 that passes through the functional layer 142. In other words, the regions where the light 111 passes through may be observed with higher brightness compared to the regions where the light 111 does not pass through. As a result, one may observe a light pattern or shading pattern formed by brighter and darker regions. Particularly, the main film 140 may include the color layer 141, and the light from the light sources 110 may pass through the color layer 141. In this case, the regions where light passes through may be observed in the color corresponding to the color layer 141.

The distribution of the generated magnetic fields may be adjusted in real time. In this case, the density distribution of the metal flakes MF may also be changed in real time, enabling the observation of a dynamic light pattern and shading pattern.

Figure 5:
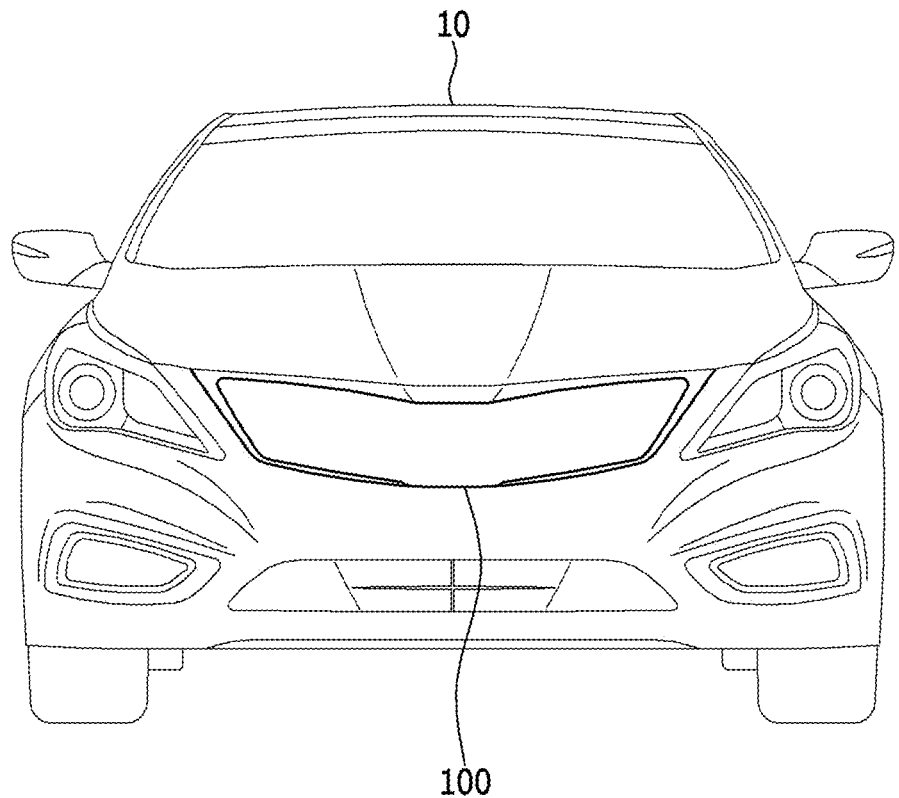
FIG. 5 is a diagram illustrating a vehicle equipped with a vehicle lamp.
Figure 6:
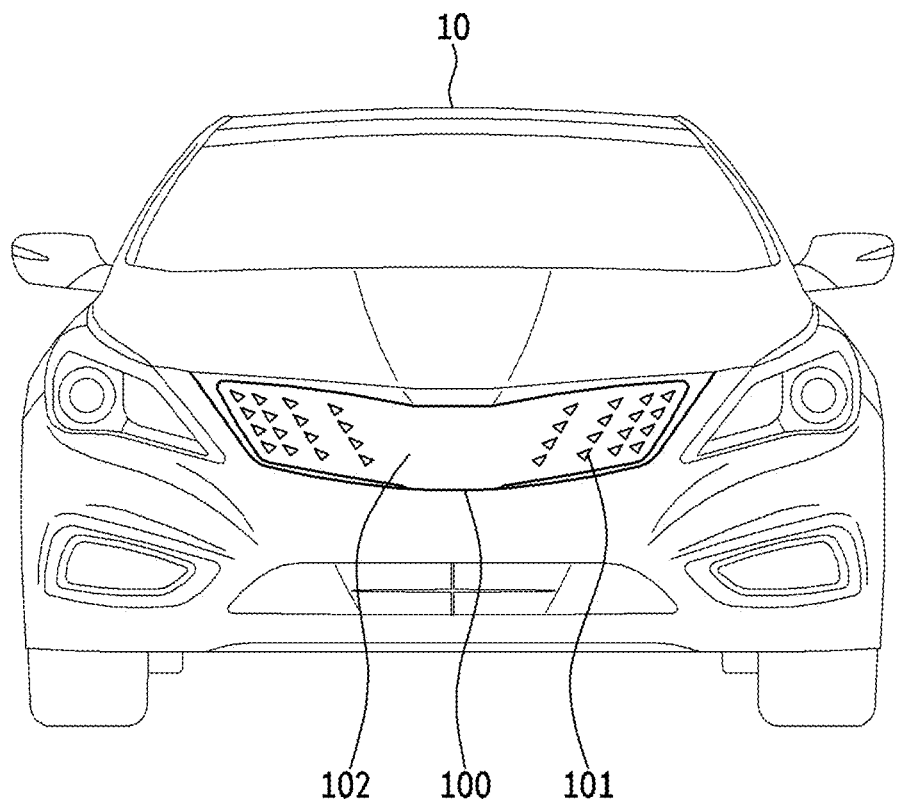
FIG. 6 is a diagram for explaining the operation of the vehicle lamp illustrated in FIG. 5.

FIG. 5 is a diagram illustrating a vehicle equipped with a vehicle lamp, and FIG. 6 is a diagram for explaining the operation of the vehicle lamp illustrated in FIG. 5.

Referring to FIG. 5, the vehicle lamp 100 may be provided in a vehicle 10.

If the vehicle 10 is an electric vehicle, it may not require a radiator grill. In this case, as illustrated in FIG. 5, the vehicle lamp 100 may be provided on the front of the vehicle 10. Meanwhile, FIG. 5 illustrates the vehicle lamp 100 as being provided on the front of the vehicle 10, but the present disclosure is not limited thereto. Alternatively or additionally, the vehicle lamp 100 may be provided on the side or rear of the vehicle 10. The vehicle lamp 100 will hereinafter be described as being provided on the front of the vehicle 10 by way of example.

Referring to FIG. 6, the vehicle lamp 100 may form a light pattern 101 and a shading pattern 102 depending on the distribution of the magnetic fields.

The light pattern 101 may represent a pattern formed by emitted light, while the shading pattern 102 may represent a pattern formed by absorbed light. The light pattern 101 may be formed as the light is emitted from the light sources 110 or as ambient light is reflected. For example, when the metal flakes MF are sparsely distributed in a specific configuration, the light pattern 101 may be formed when the light from the light sources 110 passes through the corresponding region. Alternatively, when the metal flakes MF are densely distributed in a specific configuration, the light pattern 101 may be formed as ambient light is reflected in the corresponding region. The shading pattern 102 may be formed as the light from the light sources 110 is blocked or as the reflection of ambient light is suppressed. For example, when the metal flakes MF are densely distributed in a specific configuration, the shading pattern 102 may be formed in the corresponding region as the light from the light sources 110 is blocked. Alternatively, when the metal flakes MF are sparsely distributed in a specific configuration, the shading pattern 102 may be formed in the corresponding region as the reflection of ambient light is suppressed.

The distribution of the magnetic fields may be adjusted in real time or rapidly. Through such adjustments, the position, shape, and size of the light pattern 101 and the shading pattern 102 may also be adjusted.

Figure 7:
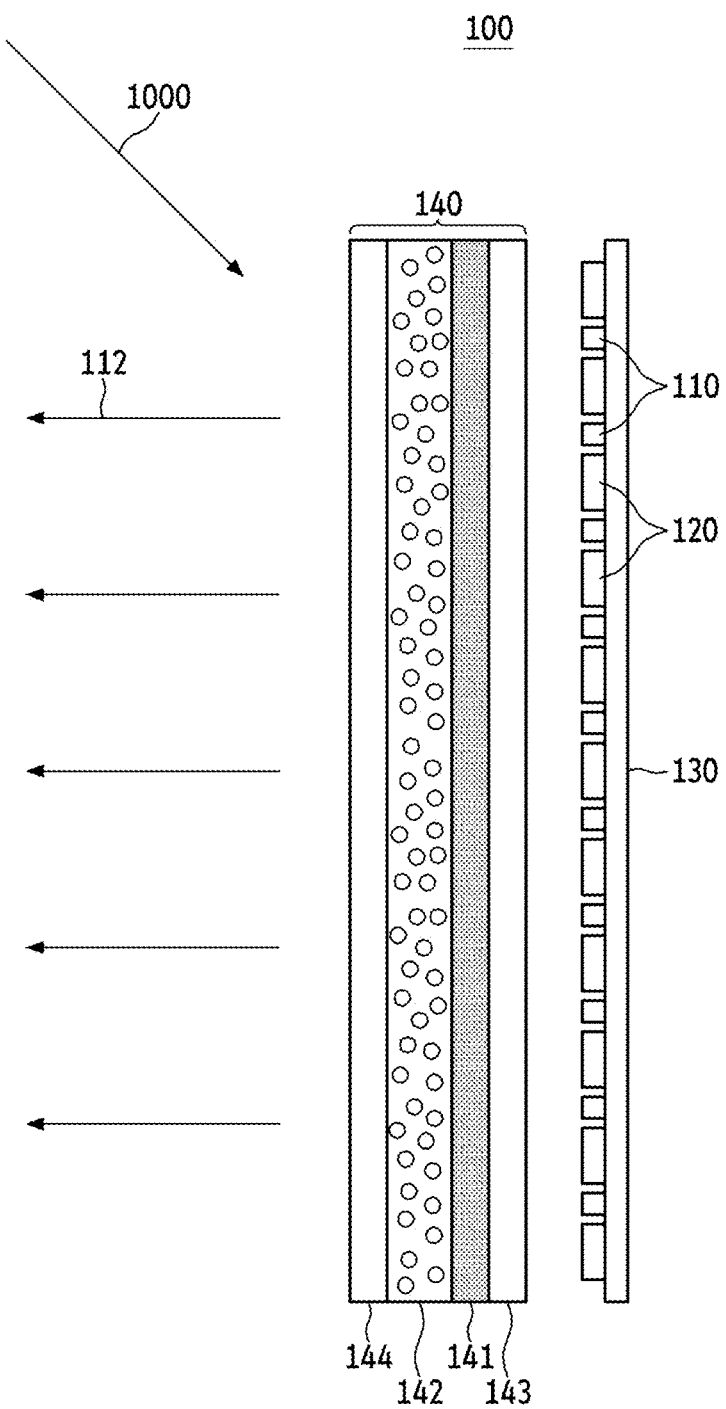
FIGS. 7 and 8 are diagrams illustrating the formation of a light pattern and a shading pattern by ambient light.
Figure 8:
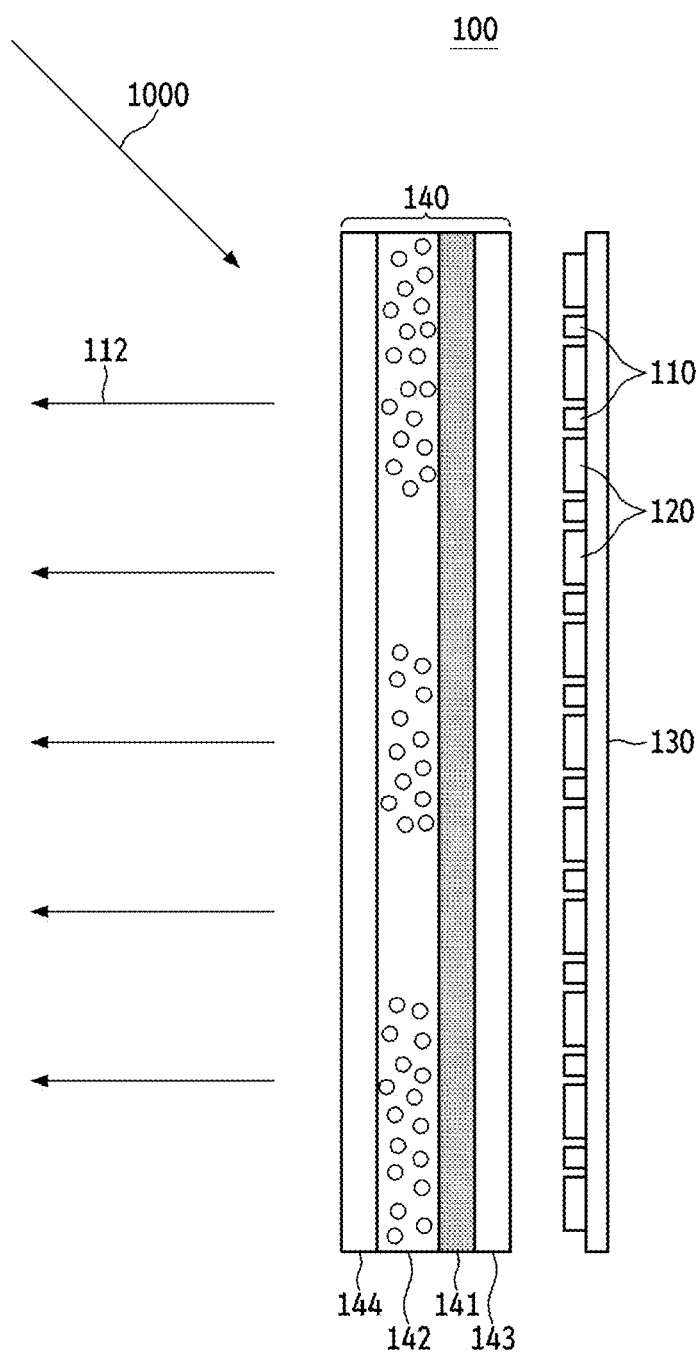
Figure 9:
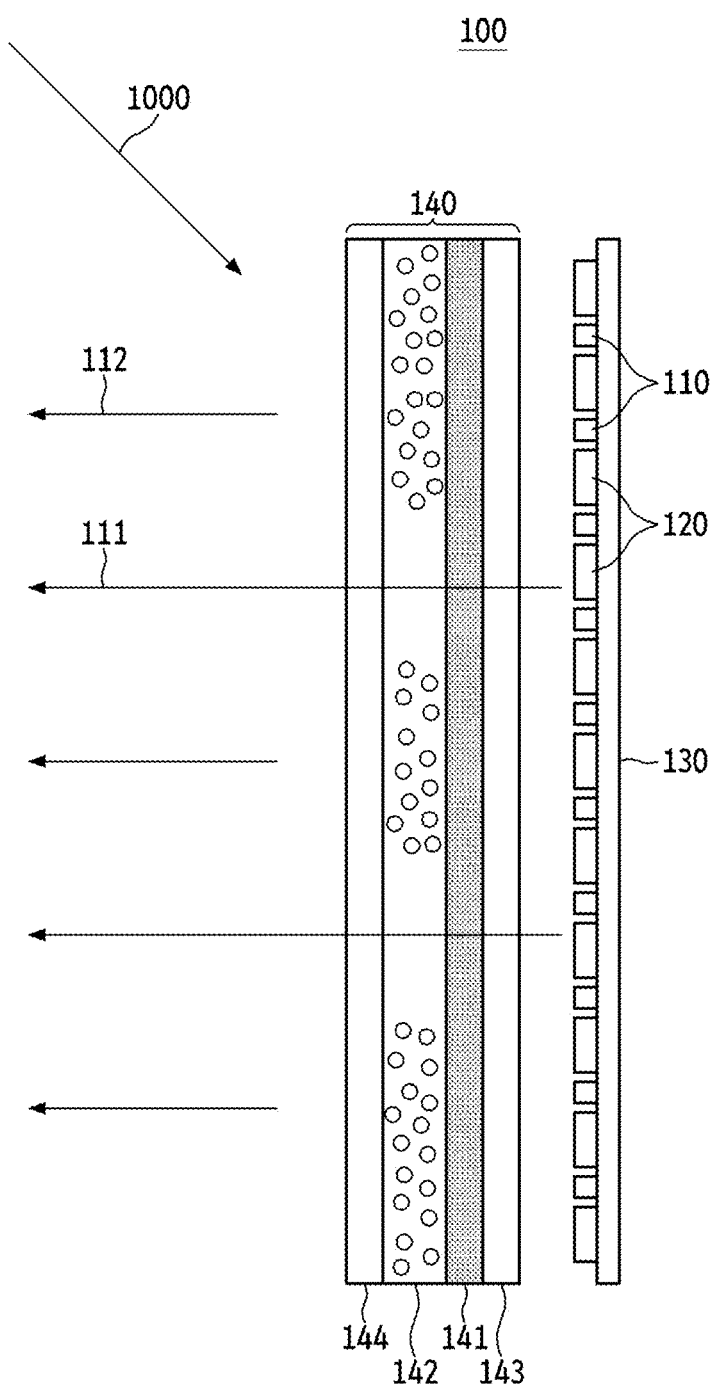
FIG. 9 is a diagram illustrating the formation of a light pattern and a shading pattern by light from the light sources.

FIGS. 7 and 8 are diagrams illustrating the formation of a light pattern and a shading pattern by ambient light, and FIG. 9 is a diagram illustrating the formation of a light pattern and a shading pattern by light from the light sources.

Referring to FIGS. 7 and 8, when the light sources 110 are turned off and ambient light 1000 is incident, the vehicle lamp 100 may project reflected light 112.

The ambient light 1000 may pass through the protective layer 144 and be reflected by the functional layer 142. The reflected light 112 of the vehicle lamp 100 may be the ambient light 1000 reflected by the functional layer 142.

As illustrated in FIG. 7, when none of the magnetic field generating units 120 disposed on the substrate 130 generate a magnetic field, the metal flakes MF may be uniformly distributed within the functional layer 142. In this case, the ambient light 1000 may be reflected across the entire area of the functional layer 142, forming the light pattern 101 across the entire area of the functional layer 142.

As illustrated in FIG. 8, when some of the magnetic field generating units 120 disposed on the substrate 130 generate a magnetic field, the metal flakes MF may be distributed within the functional layer 142 in a specific pattern. In this case, the ambient light 1000 directed to regions where the metal flakes MF are densely distributed may be reflected by the metal flakes MF, while the ambient light 1000 directed to regions where the metal flakes MF are sparsely distributed may not be reflected or may be reflected by the color layer 141. As a result, the light pattern 101 may be formed in the regions where the metal flakes MF are densely distributed, and the shading pattern 102 may be formed in the regions where the metal flakes MF are sparsely distributed. At this time, the shading pattern 102 may be observed in the color corresponding to the color layer 141.

Referring to FIG. 9, as the light 111 emitted by the light sources 110 is on, the vehicle lamp 100 may form the light pattern 101.

When some of the magnetic field generating units 120 disposed on the substrate 130 generate a magnetic field, the metal flakes MF may be distributed within the functional layer 142 in a specific pattern. In this case, the light 111 from the light sources 110 directed to the regions where the metal flakes MF are densely distributed may be obstructed by the metal flakes MF, while the light 111 directed to the regions where the metal flakes MF are sparsely distributed may pass through the color layer 141 and the functional layer 142. The ambient light 1000 directed to the regions where the metal flakes MF are densely distributed may be reflected by the metal flakes MF, forming the reflected light 112. However, the brightness of the reflected light 112 may be lower compared to the brightness of the light 111 from the light sources 110 that passes through the main film 140. As a result, the shading pattern 102 may be formed in the regions where the metal flakes MF are densely distributed, and the light pattern 101 may be formed in the regions where the metal flakes MF are sparsely distributed. Herein, as the light 111 from the light sources 110 passes through the color layer 141, the light pattern 101 may be observed in the color corresponding to the color layer 141.

Figure 10:
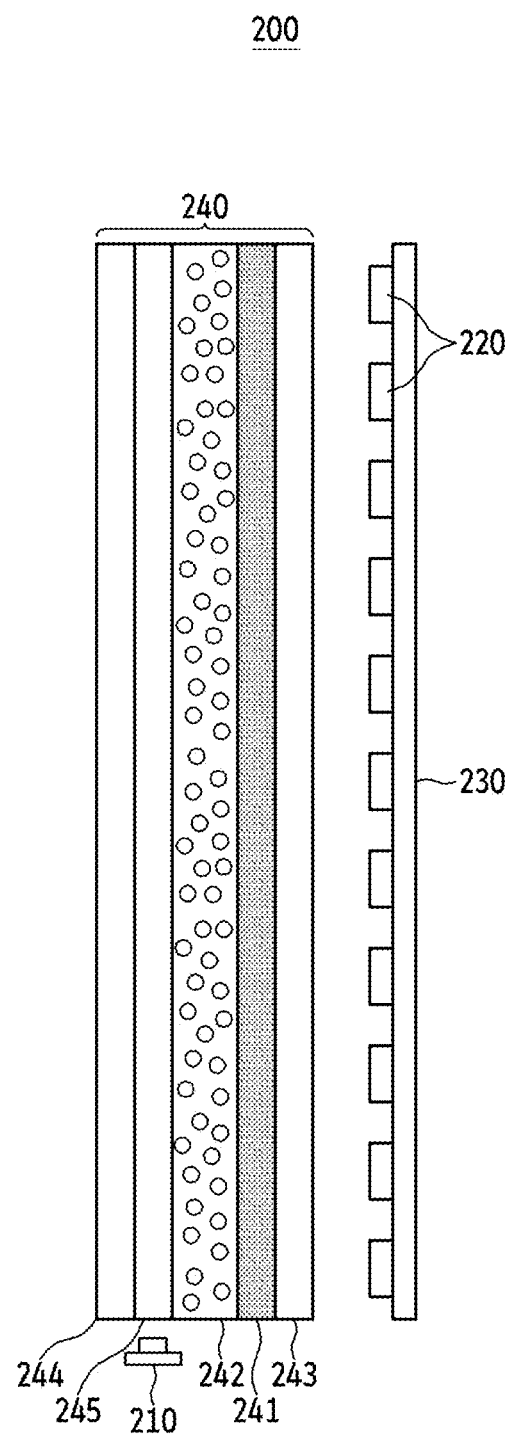
FIG. 10 is a diagram illustrating a vehicle lamp according to a second embodiment of the present disclosure.
Figure 11:
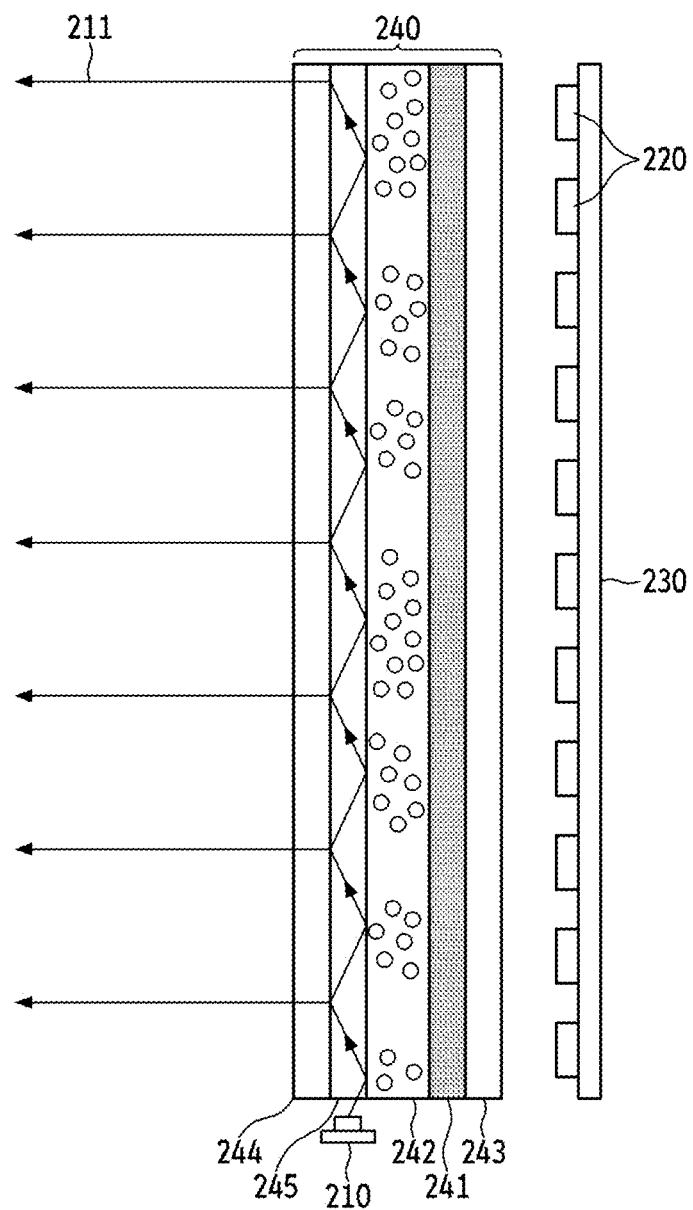
FIG. 11 is a diagram illustrating the formation of a light pattern and a shading pattern by the vehicle lamp illustrated in FIG. 10.

FIG. 10 is a diagram illustrating a vehicle lamp according to a second embodiment of the present disclosure, and FIG. 11 is a diagram illustrating the formation of a light pattern and a shading pattern by the vehicle lamp illustrated in FIG. 10.

Referring to FIGS. 10 and 11, a vehicle lamp 200 according to the second embodiment may include a light source 210, magnetic field generating units 220, a substrate 230, and a main film 240.

The configurations and functions of the light source 210, the magnetic field generating units 220, the substrate 230, and the main film 240 are substantially the same as or similar to those of the light sources 110, the magnetic field generating units 120, the substrate 130, and the main film 140 described earlier, and thus, the following will primarily describe the differences.

The main film 240 may include a color layer 241, a functional layer 242, a support layer 243, a protective layer 244, and a guide layer 245. The configurations and functions of the color layer 241, the functional layer 242, the support layer 243, and the protective layer 244 are substantially the same as or similar to those of the color layer 141, the functional layer 142, the support layer 143, and the protective layer 144 described earlier, and thus, the following will primarily describe the differences.

The guide layer 245 may be laminated on the functional layer 242 and may guide light from the light source 210, which is incident through its side, to the functional layer 242. The light source 210 may be disposed at the proximal side of the guide layer 245 and may irradiate light to the guide layer 245. The light from the light source 210 may be reflected on the surface of the guide layer 245 and irradiated to the distal end of the guide layer 245. At this time, some of the light from the light source 210 may be reflected by the metal flakes MF of the functional layer 242, thereby forming a light pattern 101.

Referring to FIG. 11, when some of the magnetic field generating units 220 disposed on the substrate 230 generate a magnetic field, the metal flakes MF may be distributed within the functional layer 242 in a specific pattern. In this case, the light from the light source 210 directed to regions where the metal flakes MF are densely distributed may be reflected by the metal flakes MF, while the light directed to regions where the metal flakes MF are sparsely distributed may be reflected by the color layer 241. Consequently, the light pattern 101 may be formed in the regions where the metal flakes MF are densely distributed, and the shading pattern 102 may be formed in the regions where the metal flakes MF are sparsely distributed.

Some of the light guided by the guide layer 245 may be reflected by the color layer 241. The color layer 241 may be provided between the magnetic field generating units 220 and the guide layer 245 and may convert light guided by the guide layer 245 into a preset color. Thus, the shading pattern 102 may be observed in the color corresponding to the color layer 241.

FIGS. 10 and 11 illustrate the guide layer 245 as being laminated on the light-emitting surface of the functional layer 242. In some embodiments, the guide layer 245 may be laminated on the light-receiving surface of the functional layer 242. A vehicle lamp including a main film with a guide layer laminated on the light-receiving surface of a functional layer will hereinafter be described with reference to FIGS. 12 and 13.

Figure 12:
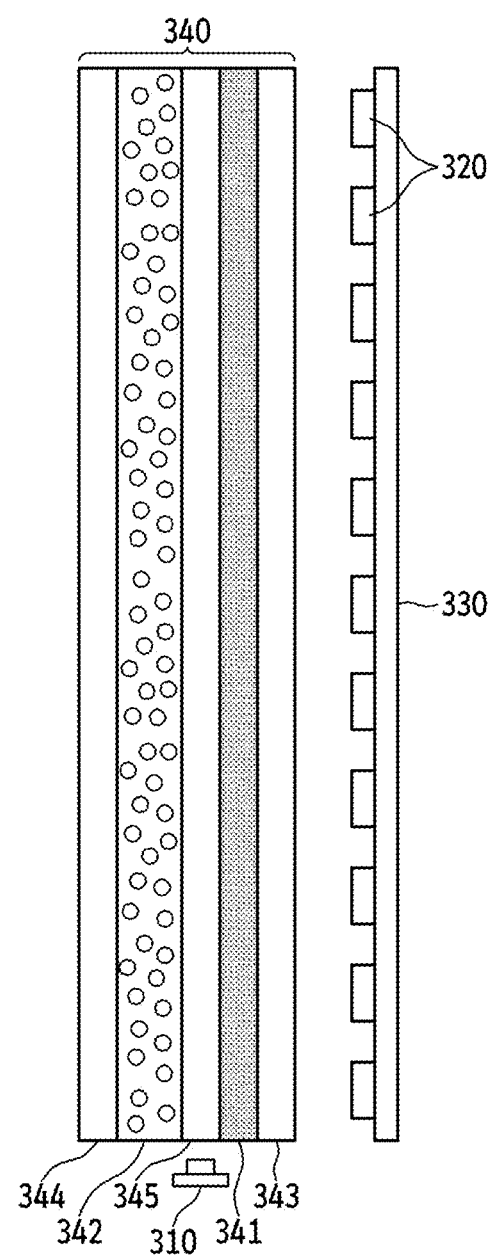
FIG. 12 is a diagram illustrating a vehicle lamp according to a third embodiment of the present disclosure.
Figure 13:
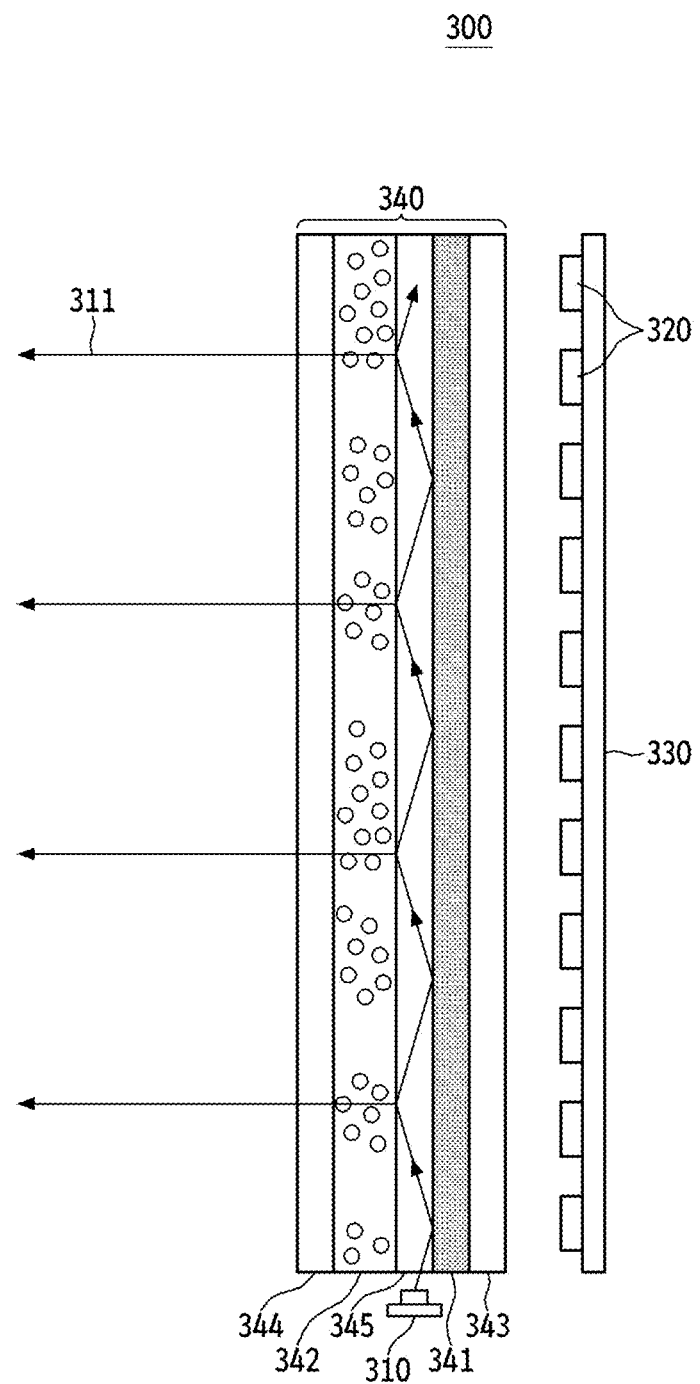
FIG. 13 illustrates the formation of a light pattern and a shading pattern by the vehicle lamp illustrated in FIG. 12.

FIG. 12 is a diagram illustrating a vehicle lamp according to a third embodiment of the present disclosure, and FIG. 13 illustrates the formation of a light pattern and a shading pattern by the vehicle lamp illustrated in FIG. 12.

Referring to FIGS. 12 and 13, a vehicle lamp 300 according to the third embodiment may include a light source 310, magnetic field generating units 320, a substrate 330, and a main film 340.

The configurations and functions of the light source 310, the magnetic field generating units 320, the substrate 330, and the main film 340 are substantially the same as or similar to those of the light sources 110, the magnetic field generating units 120, the substrate 130, and the main film 140 described earlier, and thus, the following will primarily describe the differences.

The main film 340 may include a color layer 341, a functional layer 342, a support layer 343, a protective layer 344, and a guide layer 345. The configurations and functions of the color layer 341, the functional layer 342, the support layer 343, and the protective layer 344 are substantially the same as or similar to those of the color layer 141, the functional layer 142, the support layer 143, and the protective layer 144 described earlier, and thus, the following will primarily describe the differences.

The guide layer 345 may be laminated on the functional layer 342 and may guide light 311 from the light source 310, which is incident through its side, to the functional layer 342. The light source 310 may be disposed at the proximal side of the guide layer 345 and may irradiate the light 311 to the guide layer 345. The light 311 from the light source 310 may be reflected on the surface of the guide layer 345 and irradiated to the distal end of the guide layer 345. At this time, some of the light 311 from the light source 310 may be reflected by the metal flakes MF of the functional layer 342, thereby forming a shading pattern 102.

Referring to FIG. 13, when some of the magnetic field generating units 320 disposed on the substrate 330 generate a magnetic field, the metal flakes MF may be distributed within the functional layer 342 in a specific pattern. In this case, the light 311 from the light source 310 directed to regions where the metal flakes MF are densely distributed may be reflected by the metal flakes MF, while the light directed to regions where the metal flakes MF are sparsely distributed may pass through the functional layer 342. The light 311 that passes through the functional layer 342 may be reflected by the color layer 341. Consequently, the shading pattern 102 may be formed in the regions where the metal flakes MF are densely distributed, and a light pattern 101 may be formed in the regions where the metal flakes MF are sparsely distributed.

Some of the light 311 guided by the guide layer 345 may be reflected by the color layer 341. The color layer 341 may be provided between the magnetic field generating units 320 and the guide layer 345 and may convert the light 311 guided by the guide layer 345 into a preset color. Thus, the light pattern 101 may be observed in the color corresponding to the color layer 341.

Figure 14:
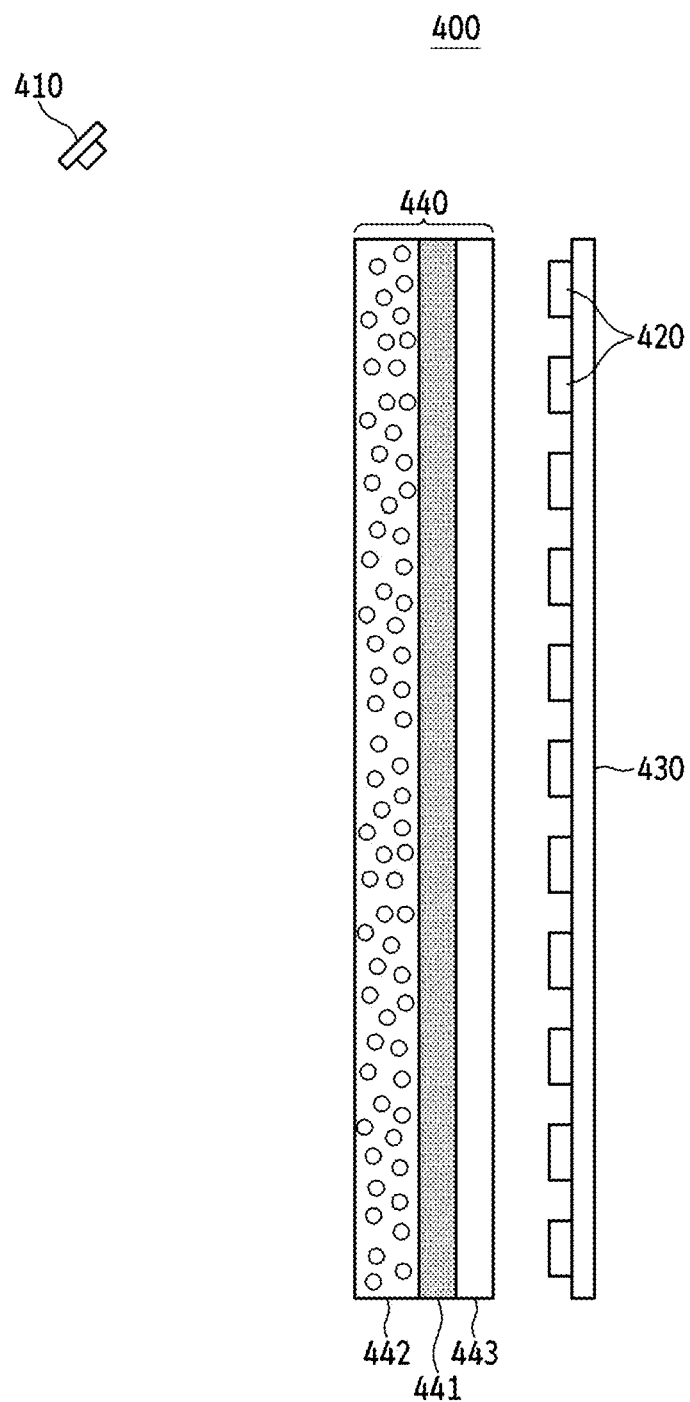
FIG. 14 is a diagram illustrating a vehicle lamp according to a fourth embodiment of the present disclosure.
Figure 15:
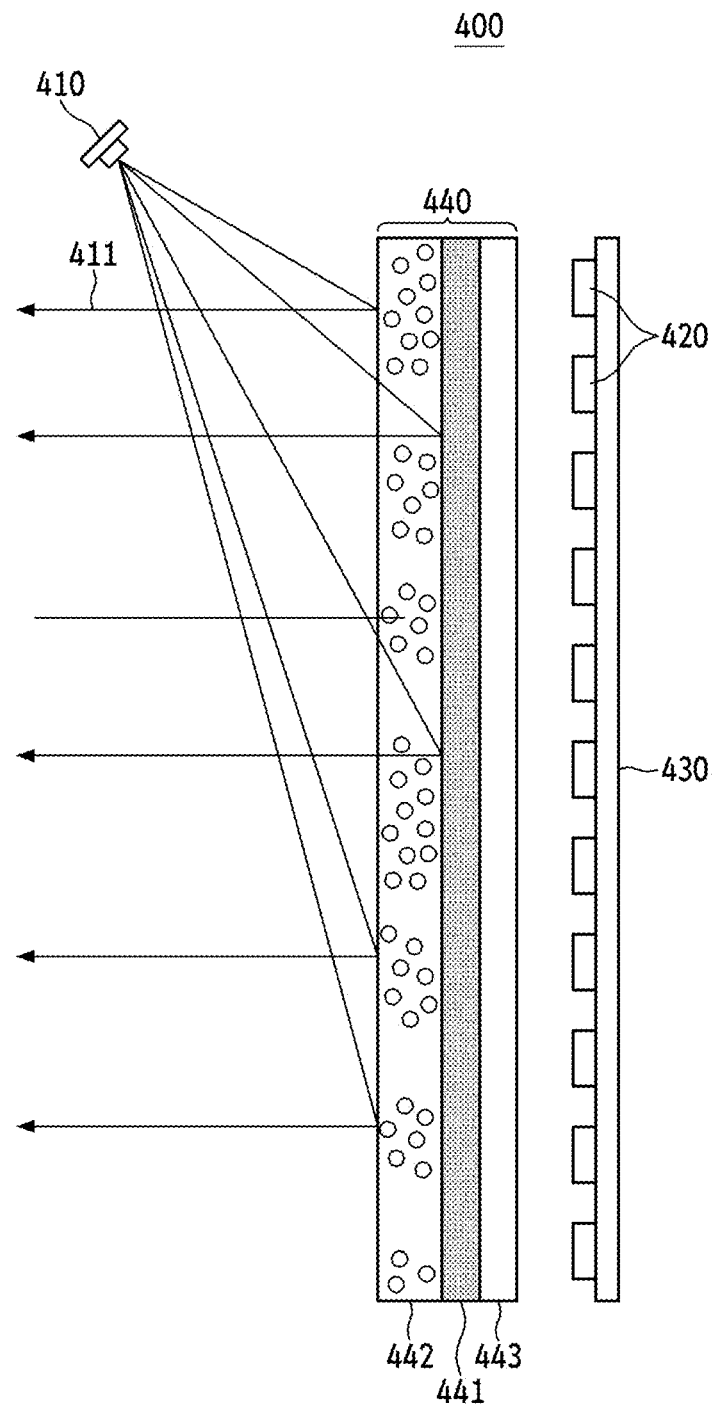
FIG. 15 is a diagram illustrating the formation of a light pattern and a shading pattern by the vehicle lamp illustrated in FIG. 14.

FIG. 14 is a diagram illustrating a vehicle lamp according to a fourth embodiment of the present disclosure, and FIG. 15 is a diagram illustrating the formation of a light pattern and a shading pattern by the vehicle lamp illustrated in FIG. 14.

Referring to FIGS. 14 and 15, a vehicle lamp 400 according to the fourth embodiment may include a light source 410, magnetic field generating units 420, a substrate 430, and a main film 440.

The configurations and functions of the light source 410, the magnetic field generating units 420, the substrate 430, and the main film 440 are substantially the same as or similar to those of the light sources 110, the magnetic field generating units 120, the substrate 130, and the main film 140 described earlier, and thus, the following will primarily describe the differences.

The main film 440 may include a color layer 441, a functional layer 442, and a support layer 443. The configurations and functions of the color layer 441, the functional layer 442, and the support layer 443 are substantially the same as or similar to those of the color layer 141, the functional layer 142, and the support layer 143 described earlier, and thus, the following will primarily describe the differences.

The light source 410 may be arranged to face the surface of the functional layer 442. Accordingly, the light source 410 may irradiate light 411 toward the surface of the functional layer 442. The functional layer 442 may selectively reflect the light 411 from the light source 410. For example, the functional layer 442 may reflect some of the light 411 incident from the light source 410 and transmit the remaining light 411. The light 411 directed to regions where the metal flakes MF are densely distributed may be reflected by the metal flakes MF, while the light 411 directed to regions where the metal flakes MF are sparsely distributed may pass through the functional layer 442. The light 411 that passes through the functional layer 442 may be reflected by the color layer 441. The color layer 441 may be provided between the magnetic field generating units 420 and the functional layer 442 and may reflect the light 411 from the light source 410 that passes through the functional layer 442 in a preset color.

Referring to FIG. 15, when some of the magnetic field generating units 420 disposed on the substrate 430 generate a magnetic field, the metal flakes MF may be distributed within the functional layer 442 in a specific pattern. In this case, the light 411 from the light source 410 directed to the regions where the metal flakes MF are densely distributed may be reflected by the metal flakes MF, while the light 411 directed to the regions where the metal flakes MF are sparsely distributed may pass through the functional layer 442 and be reflected by the color layer 441. Consequently, a light pattern 101 may be formed in the regions where the metal flakes MF are densely distributed, and a shading pattern 102 may be formed in the regions where the metal flakes MF are sparsely distributed. At this time, as the light 411 from the light source 410 is reflected by the color layer 441, the shading pattern 102 may be observed in the color corresponding to the color layer 441.

Figure 16:
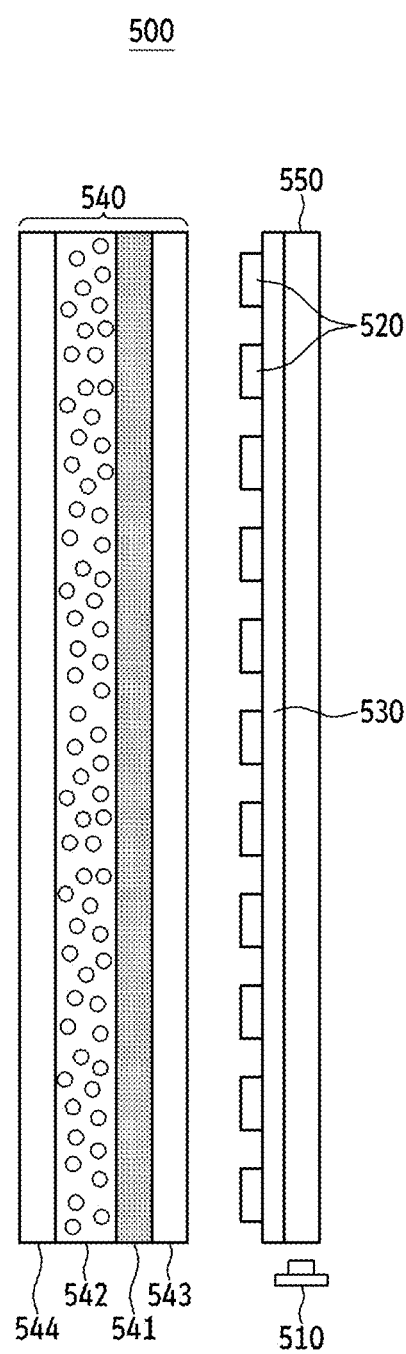
FIG. 16 is a diagram illustrating a vehicle lamp according to a fifth embodiment of the present disclosure.
Figure 17:
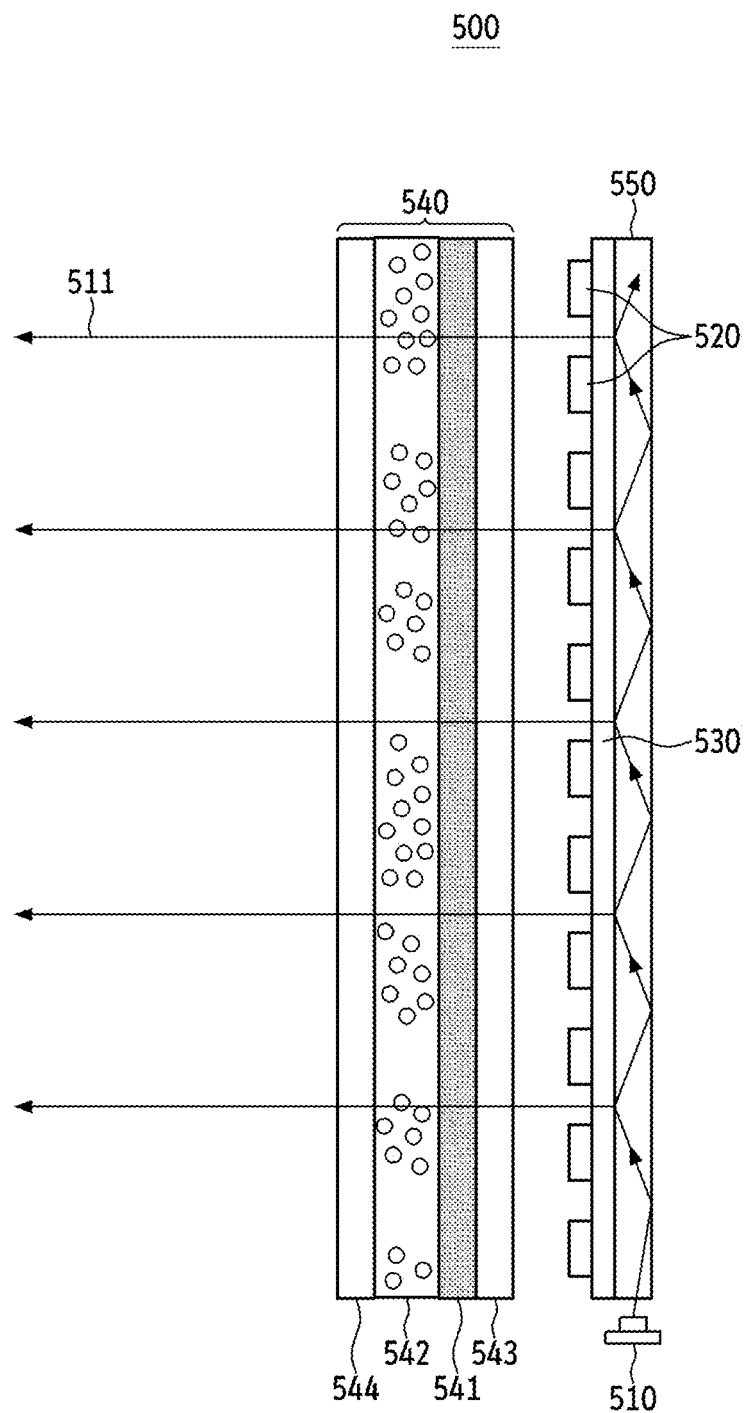
FIG. 17 is a diagram illustrating the formation of a light pattern and a shading pattern by the vehicle lamp illustrated in FIG. 16.

FIG. 16 is a diagram illustrating a vehicle lamp according to a fifth embodiment of the present disclosure, and FIG. 17 is a diagram illustrating the formation of a light pattern and a shading pattern by the vehicle lamp illustrated in FIG. 16.

Referring to FIGS. 16 and 17, a vehicle lamp 500 according to the fifth embodiment may include a light source 510, magnetic field generating units 520, a substrate 530, a main film 540, and a guide film 550.

The configurations and functions of the light source 510, the magnetic field generating units 520, the substrate 530, and the main film 540 are substantially the same as or similar to those of the light sources 110, the magnetic field generating units 120, the substrate 130, and the main film 140 described earlier, and thus, the following will primarily describe the differences.

The main film 540 may include a color layer 541, a functional layer 542, a support layer 543, and a protective layer 544. The configurations and functions of the color layer 541, the functional layer 542, the support layer 543, and the protective layer 544 are substantially the same as or similar to those of the color layer 141, the functional layer 142, the support layer 143, and the protective layer 144 described earlier, and thus, the following will primarily describe the differences.

The guide film 550 may be laminated on the substrate 530 and may guide light 511 from the light source 510, which is incident through its side, to the main film 540. The light source 510 may be disposed at the proximal side of the guide film 550 and may irradiate the light 511 to the guide film 550. The light 511 from the light source 510 may be reflected on the surface of the guide film 550 and irradiated to the distal end of the guide film 550. The substrate 530 may be provided in a transparent material. Accordingly, the light 511 emitted from the surface of the guide film 550 may pass through the substrate 530 and be irradiated to the main film 540.

Referring to FIG. 17, when some of the magnetic field generating units 520 disposed on the substrate 530 generate a magnetic field, the metal flakes MF may be distributed within the functional layer 542 in a specific pattern. In this case, the light 511 from the light source 510 directed to regions where the metal flakes MF are densely distributed may be reflected by the metal flakes MF, while the light 511 directed to regions where the metal flakes MF are sparsely distributed may pass through the functional layer 542. As a result, a shading pattern 102 may be formed in the regions where the metal flakes MF are densely distributed, and a light pattern 101 may be formed in the regions where the metal flakes MF are sparsely distributed. At this time, as the light 511 from the light source 510 passes through the color layer 541, the light pattern 101 may be observed in the color corresponding to the color layer 541.

Although the embodiments of the present disclosure have been described with reference to the accompanying drawings, those skilled in the art will understand that the present disclosure can be embodied in other specific forms without departing from the spirit or essential characteristics of the disclosure. Therefore, the described embodiments should be considered in all respects as illustrative rather than restrictive.

What is claimed is:

1. A vehicle lamp comprising:
   a light source that emits light;
   a main film disposed in a light emission path of the light source; and
   a magnetic field generating unit that generates a magnetic field that influences the main film,
   wherein the main film includes a functional layer that selectively transmits the light based on the magnetic field,
   wherein the functional layer includes a functional cover, a filler provided inside the functional cover, and metal flakes provided inside the functional cover and configured to move within the filler under the influence of the magnetic field,
   wherein the main film further includes a color layer that converts the light emitted by the light source into a preset color, and
   wherein the color layer is configured to reflect ambient light in the preset color to allow the ambient light to be reflected by the color layer and to be observed in the preset color from exterior of the vehicle lamp.

2. The vehicle lamp of claim 1, wherein the metal flakes are configured to obstruct or reflect the light emitted by the light source.

3. The vehicle lamp of claim 1, further comprising:
   a substrate on which the magnetic field generating unit is disposed.

4. The vehicle lamp of claim 3, wherein a plurality of magnetic field generating units are disposed on the substrate, and
   wherein the plurality of magnetic field generating units are configured to generate the magnetic field independent of one another.

5. The vehicle lamp of claim 3, wherein the light source is disposed on the substrate.

6. The vehicle lamp of claim 3, further comprising:
   a guide film that is laminated on the substrate and guides the light emitted by the light source, which is incident through a side of the guide film, to the main film.

7. The vehicle lamp of claim 6, wherein the substrate is formed of a transparent material, and
   wherein the light emitted from a surface of the guide film passes through the substrate and is irradiated to the main film.

8. The vehicle lamp of claim 1, wherein the main film further includes a guide layer that is laminated on the functional layer and guides the light emitted by the light source, which is incident through a side of the guide layer, to the functional layer.

9. The vehicle lamp of claim 8, wherein the guide layer is laminated on a light-receiving surface or a light-emitting surface of the functional layer.

10. The vehicle lamp of claim 8, wherein the color layer is provided between the magnetic field generating unit and the guide layer and converts the light guided by the guide layer into the preset color.

11. The vehicle lamp of claim 1, wherein the color layer is provided between the light source and the functional layer.

12. The vehicle lamp of claim 1, wherein the magnetic field generating unit comprises an inductor.

13. The vehicle lamp of claim 1, wherein the light source is configured to emit the light toward a surface of the functional layer.

14. The vehicle lamp of claim 13, wherein the color layer is provided between the magnetic field generating unit and the functional layer and reflects, in the preset color, the light emitted by the light source that passes through the functional layer.

* * * * *